US009424260B2

(12) United States Patent
Qi et al.

(10) Patent No.: US 9,424,260 B2
(45) Date of Patent: Aug. 23, 2016

(54) TECHNIQUES FOR DATA ASSIGNMENT FROM AN EXTERNAL DISTRIBUTED FILE SYSTEM TO A DATABASE MANAGEMENT SYSTEM

(71) Applicant: Teradata US, Inc., Dayton, OH (US)

(72) Inventors: Yan Qi, Fremont, CA (US); Yu Xu, Burlingame, CA (US); Olli Pekka Kostamaa, Santa Monica, CA (US); Jian Wen, Irvine, CA (US)

(73) Assignee: Teradata US, Inc., Dayton, OH (US)

( * ) Notice: Subject to any disclaimer, the term of this patent is extended or adjusted under 35 U.S.C. 154(b) by 134 days.

(21) Appl. No.: 14/218,183

(22) Filed: Mar. 18, 2014

(65) Prior Publication Data
US 2014/0222871 A1    Aug. 7, 2014

Related U.S. Application Data

(63) Continuation of application No. 13/340,335, filed on Dec. 29, 2011, now Pat. No. 8,713,057.

(51) Int. Cl.
*G06F 17/30* (2006.01)

(52) U.S. Cl.
CPC .... *G06F 17/30079* (2013.01); *G06F 17/30545* (2013.01); *G06F 17/30557* (2013.01)

(58) Field of Classification Search
USPC .................................. 707/790–798; 345/440
See application file for complete search history.

(56) References Cited

U.S. PATENT DOCUMENTS

| 5,414,809 | A | 5/1995 | Hogan et al. |
| 5,680,603 | A | 10/1997 | Bhargava et al. |
| 5,701,455 | A | 12/1997 | Bhargava |
| 5,832,477 | A | 11/1998 | Bhargava et al. |
| 5,991,754 | A | 11/1999 | Raitto et al. |
| 6,957,222 | B1 | 10/2005 | Ramesh |
| 7,539,697 | B1 | 5/2009 | Akella |
| 7,546,311 | B2 | 6/2009 | Nica |
| 7,730,055 | B2 | 6/2010 | Bellamkonda et al. |
| 7,822,795 | B2 | 10/2010 | Sangal et al. |
| 7,861,247 | B1 * | 12/2010 | Santos ................ G06F 9/5011 700/28 |
| 7,865,582 | B2 * | 1/2011 | Santos ................ G06F 9/5005 709/201 |
| 7,979,479 | B2 | 7/2011 | Staebler et al. |
| 8,082,273 | B2 * | 12/2011 | Brown ................ G06F 9/5083 707/782 |
| 8,495,004 | B2 | 7/2013 | Dheap et al. |
| 8,543,596 | B1 * | 9/2013 | Kostamaa ......... G06F 17/30194 707/770 |
| 9,183,058 | B2 * | 11/2015 | Li ......................... G06F 9/5066 |
| 2002/0163518 | A1 | 11/2002 | Hawley, III et al. |
| 2004/0088147 | A1 * | 5/2004 | Wang ..................... G06Q 10/10 703/2 |
| 2005/0228850 | A1 * | 10/2005 | Zhu ....................... G06F 9/5005 709/200 |
| 2005/0228852 | A1 * | 10/2005 | Santos ................ G06F 9/5005 709/200 |
| 2007/0271570 | A1 * | 11/2007 | Brown ................ G06F 9/5033 718/105 |

(Continued)

OTHER PUBLICATIONS

"U.S. Appl. No. 13/340,335, Notice of Allowance mailed Dec. 16, 2013", 11 pgs.

*Primary Examiner* — Hanh Thai
(74) *Attorney, Agent, or Firm* — Schwegman, Lundberg & Woessner, P.A.

(57) ABSTRACT

Techniques for data assignment from an external distributed file system (DFS) to a database management system (DBMS) are provided. Data blocks from the DFS are represented as first nodes and access module processors of the DBMS are represented as second nodes. A graph is produced with the first and second nodes. Assignments are made for the first nodes to the second nodes based on evaluation of the graph to integrate the DFS with the DBMS.

20 Claims, 7 Drawing Sheets

(56) References Cited

U.S. PATENT DOCUMENTS

| | | | |
|---|---|---|---|
| 2007/0276833 A1* | 11/2007 | Sen | G06F 17/30312 |
| 2008/0218518 A1 | 9/2008 | Zhou et al. | |
| 2008/0295094 A1* | 11/2008 | Korupolu | G06F 9/5066 |
| | | | 718/1 |
| 2009/0132611 A1* | 5/2009 | Brown | G06F 17/30575 |
| 2011/0060750 A1 | 3/2011 | Kuhn et al. | |
| 2011/0069634 A1* | 3/2011 | Hajiaghayi | H04L 45/00 |
| | | | 370/254 |
| 2011/0185064 A1* | 7/2011 | Head | G06F 9/5077 |
| | | | 709/226 |
| 2012/0110055 A1* | 5/2012 | Van Biljon | G06Q 30/04 |
| | | | 709/201 |
| 2012/0120924 A1* | 5/2012 | Montojo | H04W 48/12 |
| | | | 370/336 |
| 2012/0173734 A1* | 7/2012 | Kimbrel | G06F 9/5083 |
| | | | 709/226 |
| 2013/0041872 A1* | 2/2013 | Aizman | G06F 17/30194 |
| | | | 707/690 |
| 2013/0117062 A1* | 5/2013 | Rangarajan | G06Q 10/06 |
| | | | 705/7.25 |
| 2013/0166601 A1 | 6/2013 | Chrapko et al. | |
| 2015/0261474 A1* | 9/2015 | Vorbach | G06F 3/0647 |
| | | | 710/52 |

* cited by examiner

US 9,424,260 B2

TECHNIQUES FOR DATA ASSIGNMENT FROM AN EXTERNAL DISTRIBUTED FILE SYSTEM TO A DATABASE MANAGEMENT SYSTEM

CLAIM OF PRIORITY

This application is a continuation of and claims the benefit of priority under 35 U.S.C. 120 to U.S. patent application Ser. No. 13/340,335, filed Dec. 29, 2011, which is set to issue a U.S. Pat. No. 8,713,057 on Apr. 29, 2014 and which is hereby incorporated by reference herein in its entirety.

BACKGROUND

After over two-decades of electronic data automation and the improved ability for capturing data from a variety of communication channels and media, even the smallest of enterprises find that the enterprise is processing terabytes of data with regularity. Moreover, mining, analysis, and processing of that data have become extremely complex. The average consumer expects electronic transactions to occur flawlessly and with near instant speed. The enterprise that cannot meet expectations of the consumer is quickly out of business in today's highly competitive environment.

Consumers have a plethora of choices for nearly every product and service, and enterprises can be created and up-and-running in the industry it mere days. The competition and the expectations are breathtaking from what existed just a few short years ago.

The industry infrastructure and applications have generally answered the call providing virtualized data centers that give an enterprise an ever-present data center to run and process the enterprise's data. Applications and hardware to support an enterprise can be outsourced and available to the enterprise twenty-four hours a day, seven days a week, and three hundred sixty-five days a year.

As a result, the most important asset of the enterprise has become its data. That is, information gathered about the enterprise's customers, competitors, products, services, financials, business processes, business assets, personnel, service providers, transactions, and the like.

Updating, mining, analyzing, reporting, and accessing the enterprise information can still become problematic because of the sheer volume of this information and because often the information is dispersed over a variety of different file systems, databases, and applications.

In response, the industry has recently embraced a data platform referred to as Apache Hadoop™ (Hadoop™). Hadoop™ is an Open Source software architecture that supports data-intensive distributed applications. It enables applications to work with thousands of network nodes and petabytes (1000 terabytes) of data. Hadoop™ provides interoperability between disparate file systems, fault tolerance, and High Availability (HA) for data processing. The architecture is modular and expandable with the whole database development community supporting, enhancing, and dynamically growing the platform.

However, because of Hadoop's™ success in the industry, enterprises now have or depend on a large volume of their data, which is stored external to their core in-house database management system (DBMS). This data can be in a variety of formats and types, such as: web logs; call details with customers; sensor data, Radio Frequency Identification (RFID) data; historical data maintained for government or industry compliance reasons; and the like. Enterprises have embraced Hadoop™ for data types such as the above referenced because Hadoop™ is scalable, cost efficient, and reliable.

One challenge in integrating Hadoop™ architecture with an enterprise DBMS is efficiently assigning data blocks and managing workloads between nodes. That is, even when the same hardware platform is used to deploy some aspects of Hadoop and a DBMS the resulting performance of such a hybrid system can be poor because of how the data is distributed and how workloads are processed.

SUMMARY

In various embodiments, techniques for data assignment from an external distributed file system (DFS) to a DBMS are presented. According to an embodiment, a method for data assignment from an external DFS to a DBMS is provided.

Specifically, an initial assignment for first nodes to second nodes is received in a bipartite graph. The first nodes represent data blocks in an external distributed file system and the second nodes represent access module processors of a database management system (DBMS). A residual graph is constructed with a negative cycle having the initial assignment. The residual graph is processed through iterations, with each of which the initial assignment is adjusted to eliminate negative cycles. Finally, a final assignment is achieved by removing all negative cycles of the residual graph, for each of the data blocks to one of the access module processors as an assignment flow.

DETAILED DESCRIPTION

Figure 1:
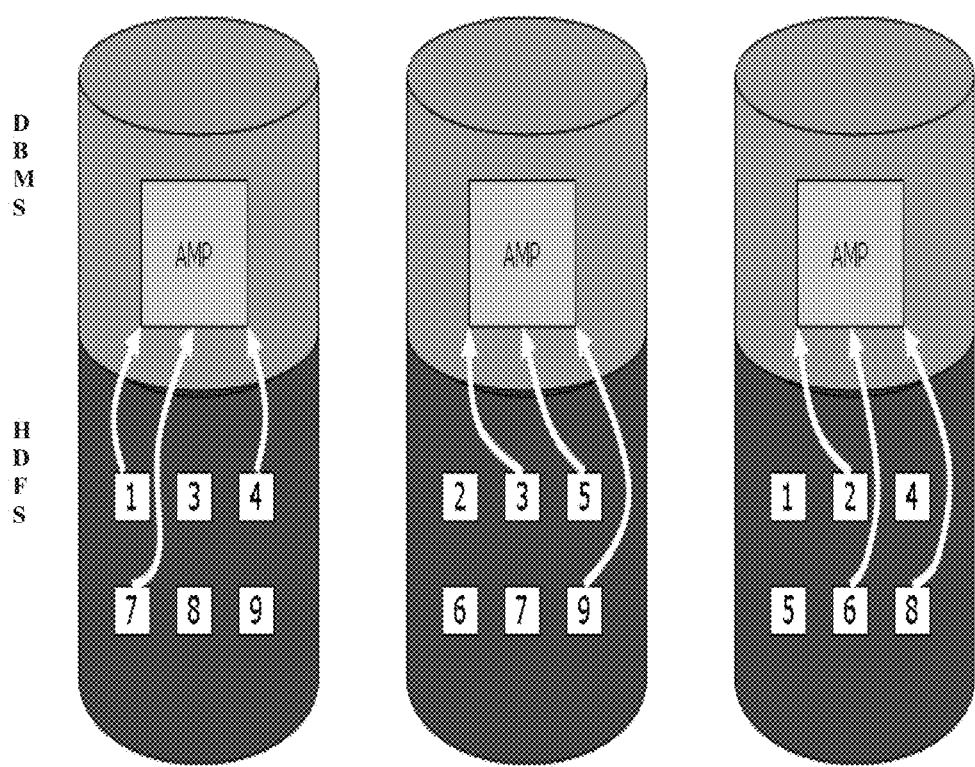
FIG. 1 is a diagram depicting an even assignment of data from a HDFS to a parallel DBMS, according to an example embodiment.

Initially for purposes of illustration and comprehension some context and examples are presented to highlight and illustrate the techniques being presented herein and below.

When a parallel DBMS and Hadoop™ Distributed File System (DFS) are deployed on the same node sharing processors and memory, local data can be transferred from the Hadoop™ DFS to the parallel in a highly efficient way. The network can be a bottleneck however, if Access Module Processors (AMPs) have to read a large scale amount of data stored from remote nodes. On the other hand, each AMP can be assigned nearly the same amount of workload when the parallelism is concerned, especially when the HDFS (Hadoop™ DFS) data are distributed across a cluster. Usually in the cluster, each DBMS node is configured with the same number of AMPs and all AMPs have the same performance. For purposes of illustration, it is assumed that each node has exactly one AMP in the descriptions that follow.

Also, as used herein the terms, "node" and "AMP" may be used synonymously interchangeably with one another.

Given a set of M nodes (one AMP per node) and a set of N data blocks B={B_1, B_2, ..., B_N}, each block has K copies on K different nodes. Formally, an assignment of N blocks to M AMPs, is denoted as a set, A'={A_1, A_2, ..., A_M}, such that the following requirements are satisfied:

A_i is a set of blocks {B_i1, B_i2 ...} assigned to AMP i;
All blocks should be assigned, $$\bigcup_{i=1}^{M} A\_i = B;$$

and

Each block can be assigned only once, $A\_i \cap A\_j = \phi$.

In an assignment, a data block, B_ij is called a local assignment to A_i if it has a copy in the node where AMP i is. Otherwise, B_ij is a remote assignment to A_i, which causes data transferring through network. Correspondingly, a cost (A') is used to measure the number of remote assignments occurring to A'.

Furthermore, an "even assignment" is defined as an assignment, which has $\||A\_i|-|A\_j|\| < 2$ for any A_i and A_j. In other words, an even assignment gives each AMP almost the same amount of workload. Conceivably, multiple even assignments can exist when assigning N blocks to M AMPs, but their remote assignments may not be the same. The goal is to achieve one of the even assignments with the minimal cost (A').

Remote costs can be huge if a naïve approach is employed. For instance, if a module operator is used to decide the assignment of each block, then B_i is assigned as AMP k (=i mod M). So, a cost of module approach can be up to one third of the total using the approach visually illustrated in the FIG. 1.

The problem of finding an even assignment with the minimal cost can be solved in the framework of network theory. Specifically, a bipartite network G=(s, t, V_1, V_2, E) can be used to describe the assignment problem.

i. Two sets of vertices V_1 and V_2 represent the data blocks and AMPs respectively, thus v_i in V_1 (or V_2) denotes block B_i (or AMP i).

ii. An edge directs from v_i in V_1 to v_j in V_2.
  1. The associated cost is 0 if block B_i has a copy on the node where AMP j is; otherwise, the cost is 1.
  2. The associated capacity ranges from 0 to 1.

iii. There is no an edge between any pair of vertices in V_1 (or in V_2).

iv. Vertices s and t are newly introduced as the source and target of the network correspondingly, such that source s has an edge reaching all vertices in V_1, and all vertices in V_2 connect with target t.

1. The cost associated with these edges is 0.
  2. The edge starting from s has the capacity exactly as 1, for all blocks should be assigned.
  3. The edge ending at t has the capacity from $$\left\lfloor \frac{N}{M} \right\rfloor \text{ to } \left\lceil \frac{N}{M} \right\rceil,$$

because of the even-assignment requirement, where N=|V_1| and M=|V_2|.

Figure 2:
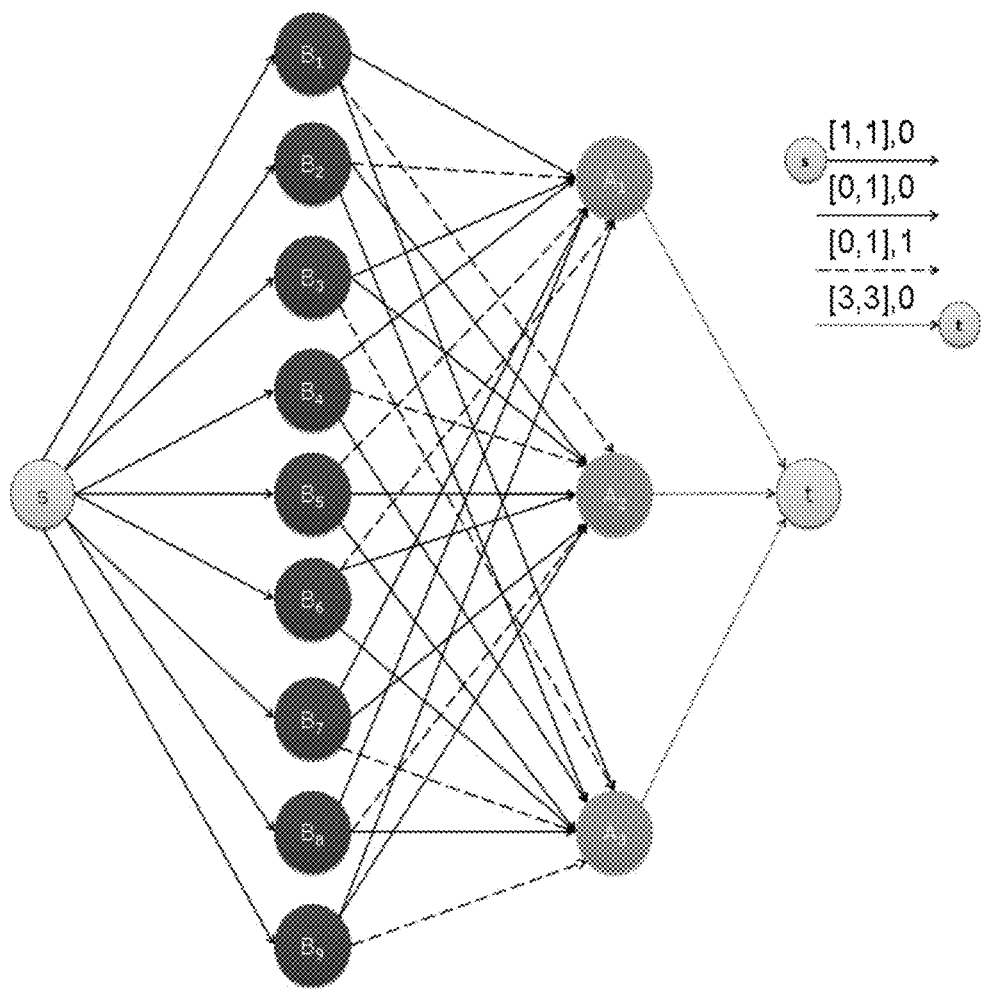
FIG. 2 is a diagram showing a bipartite graph for the example presented in the FIG. 1, according to an example embodiment.

The example shown in the FIG. 1 is modeled as a bipartite network in the FIG. 2.

The assignment problem can be converted into the problem of finding the min-cost flow in the bipartite network G=(s, t, V_1, V_2, E). Traditionally, cycle-canceling algorithm is one of the most popular algorithms for solving the min-cost flow problem. The cycle-canceling algorithm improves a feasible solution (i.e., an assignment) by sending augmenting flows along directed cycles with negative cost (called negative cycles). Specifically, it searches for the negative cycles existing in the residual graph of the feasible solution, and adjusts the flow along the negative cycles to reduce flow cost. Adjusting flows along the negative cycles does not change the total flow capacity, because there is not any external flow introduced; the block assignment is improved correspondingly.

The algorithm can be described as:
1) Initialize the algorithm with a feasible solution f;
2) Construct the residual graph G' from f;
3) While G' contains a negative cycle:
4) Adjust the feasible solution f by the negative cycle; and
5) Return the flow as an optimal solution.

Figure 3:
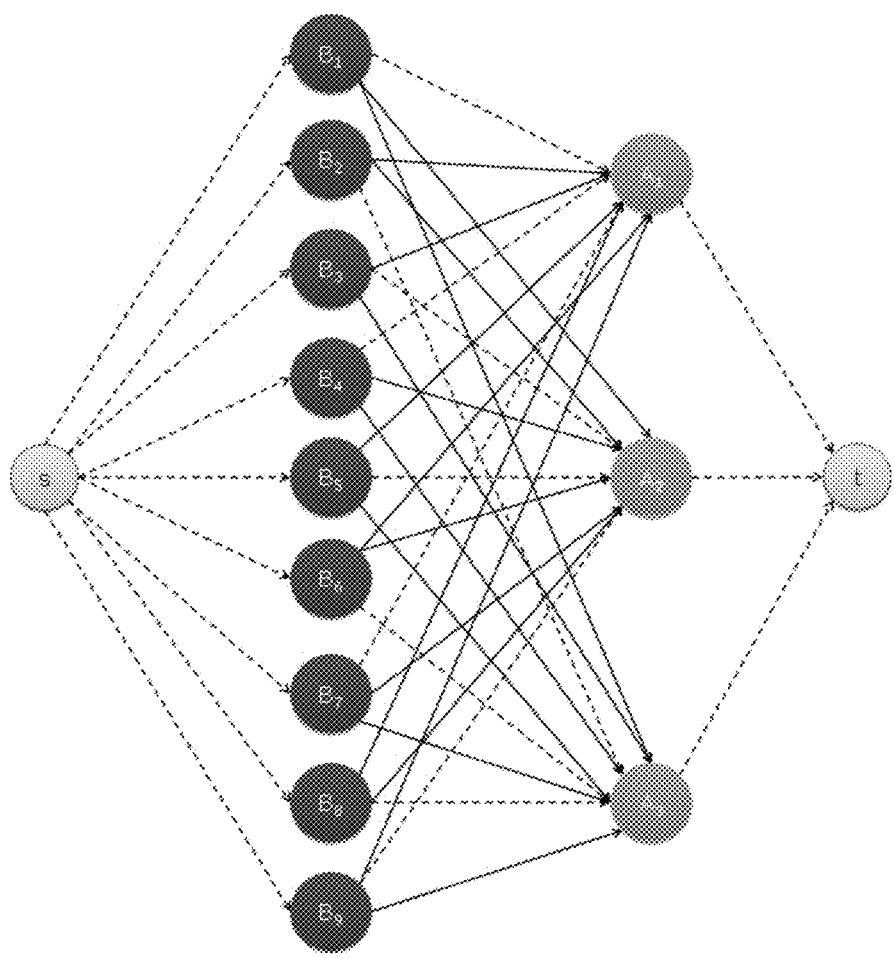
FIG. 3 is a diagram illustrating an even assignment with minimal cost as shown in the FIG. 2, according to an example embodiment.

The dash lines in the FIG. 3 display a min-cost flow for the network defined in FIG. 3. Those connecting vertices in V_1 with that in V_2 give the same assignment as FIG. 2.

According to Algorithm 1, the complexity of cycle-canceling algorithm is composed of two parts: the cost of finding a feasible solution and the part of improving the feasible solution for a min-cost network flow. The focus here is on the second part, because the cost of finding a feasible solution can be relatively much cheaper (i.e., O(N)). Finding a negative cycle in the bipartite network G=(s, t, V_1, V_2, E), has a complexity of $O(M^2N)$, whereas there exist at most N negative cycles. Therefore the complexity of the algorithm can be described as $O(M^2N^2)$.

Approximate the Solution with Less Time Cost

The idea of converting the assignment problem into a min-cost flow problem and using cycle-canceling to obtain the optimal solution, is cost effective to implement. However, the complexity of the algorithm is not always satisfying. For instance, it can take over 10 seconds to assign 3565 blocks to 100 AMPs when a MacBook® Pro with 2.4 GHz Intel® Core 2 Duo CPU and 4 GB DDR3 memory is used for the execution.

In some cases, a number of remote block transferring can be allowed to complete the assignment with less time cost, as long as the even assignment is guaranteed. Therefore, approximation approaches are achievable. One such approach is now presented as an "Approximate-Greedy Algorithm" (AGA) to solve the even-assignment problem. The AGA obtains an even assignment much faster than the cycle-canceling algorithm usually, but its cost may not be minimal.

The basic idea of the algorithm is to assign a block to AMPs having its copies, otherwise to an AMP with minimum assignments so far. It can be described as Algorithm 2 below:

1. For each block $B_i$;
2. FOR each AMP $A_j$ containing a replica of $B_i$;
3.    IF $A_j$ is not saturated and $A_j$ has the minimum load:
4.       Assign $B_i$ to $A_j$, and continue to Step 1;
5. FOR each AMP $A_j$ containing a replica $B_i$;
6.    FOR each block $B_l$ assign to $A_j$:
7.       FOR each AMP $A_g$ containing a replica of $B_l$;
8.          IF $A_g$ is not saturated and $A_g$ has the minimum load:
9.             Re-assign $B_l$ from $A_j$ to $A_g$;
10.             Assign Bi to $A_j$, and continue to Step 1; and
11. Assign $B_i$ remotely to an AMP with minimum load.

The loop from line 2 to line 4 tries to assign a block (e.g., B_i) to an AMP with its local copies, if possible. If all AMPs having B_i are saturated, the blocks that have been assigned to those AMPs are considered for re-assignment: if one of these blocks can be assigned to any other AMP having its copies, it is moved to that AMP and at the same time B_i takes its place. But when re-assignment is impossible, B_i is assigned to an AMP with minimum assigned blocks currently, as a remote assignment.

Figure 4:
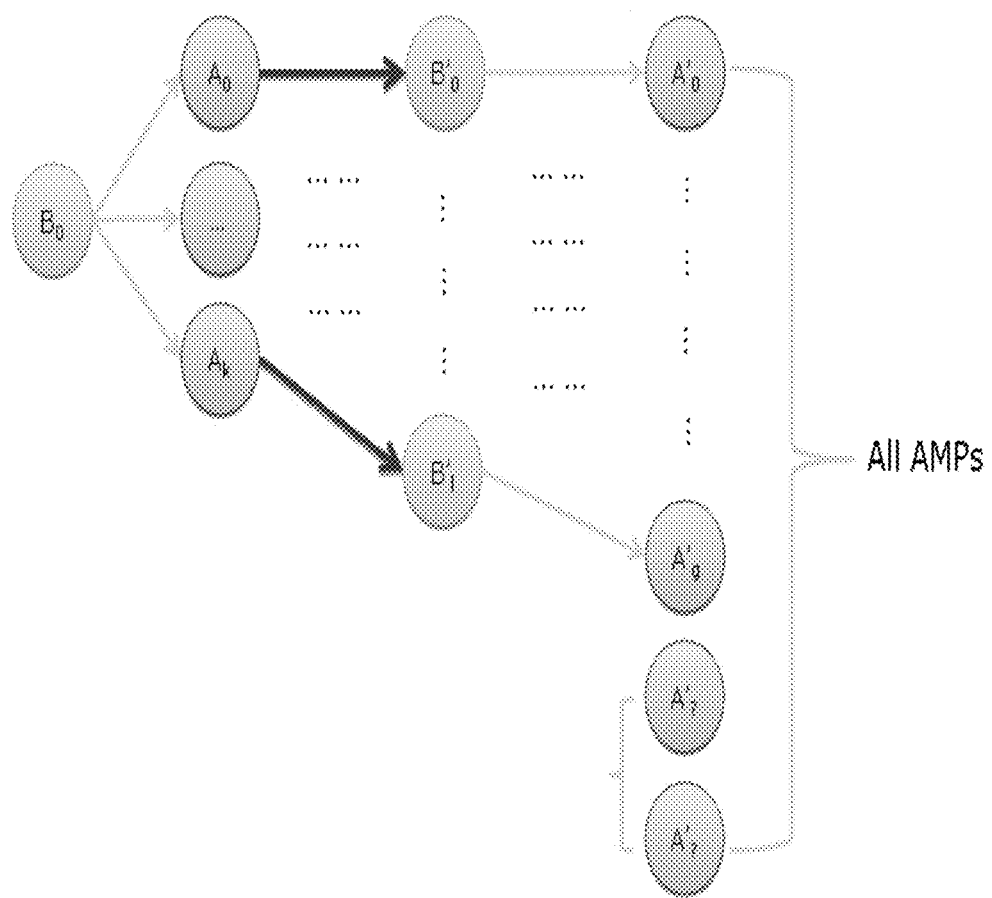
FIG. 4 is a diagram illustrating an assignment of a block of data using an Approximate-Greedy Algorithm, according to an example embodiment.

The instinct behind the AGA is that the probability of finding a re-assignment is very high when the number of blocks (i.e., N) is far larger than that of AMPs (i.e., M). This can be explained by the diagram presented in the FIG. 4.

To assign block B_0, the AMPs (A_0, A_1, ..., A_k at the second level) are first considered to see if they have its local copies. If all these AMPs are saturated, $$\frac{NK}{M}$$

blocks (B'_0, B'_1, ..., B'_l at the third level, where $$l = \frac{NK}{M})$$

are checked for re-assignment. Then, the AMPs (A'_0, A'_1, ..., A'_g at the fourth level) having their local copies must be considered. Assume that all blocks including their copies are randomly distributed across AMPs initially; the probability that the value of 'g' being equal to M can be close to 1 in most cases.

The complexity of the AGA is also composed of two parts: the first $$\frac{NK}{M}$$

blocks can always be assigned locally in $$O\left(\frac{NK^2}{M}\right).$$

and in the worst case all other blocks are considered for re-assignment in $$O\left(\left(N - \frac{NK}{M}\right)\left(K + \frac{NK^2}{M} + M - K\right)\right).$$

Thus, the overall complexity of the AGA is:

$$O\left(\left(N - \frac{NK}{M}\right)\left(K + \frac{NK^2}{M} + M\right)\right).$$

Modeling the assignment problem as the min-cost network flow problem makes it possible to apply existing efficient algorithms. Adapting the existing cycle-canceling approach, a negative cycle-canceling algorithm is proposed, which is cost-effective to implement and can achieve the optimal solution in polynomial time. Furthermore, the approximation is used as an alternative, when a number of remote data transferring is allowed to obtain a rather good solution within much lower time cost. Moreover, the AGA is simple to implement and is effective enough when the number of blocks is far more than that of AMPs.

Figure 5:
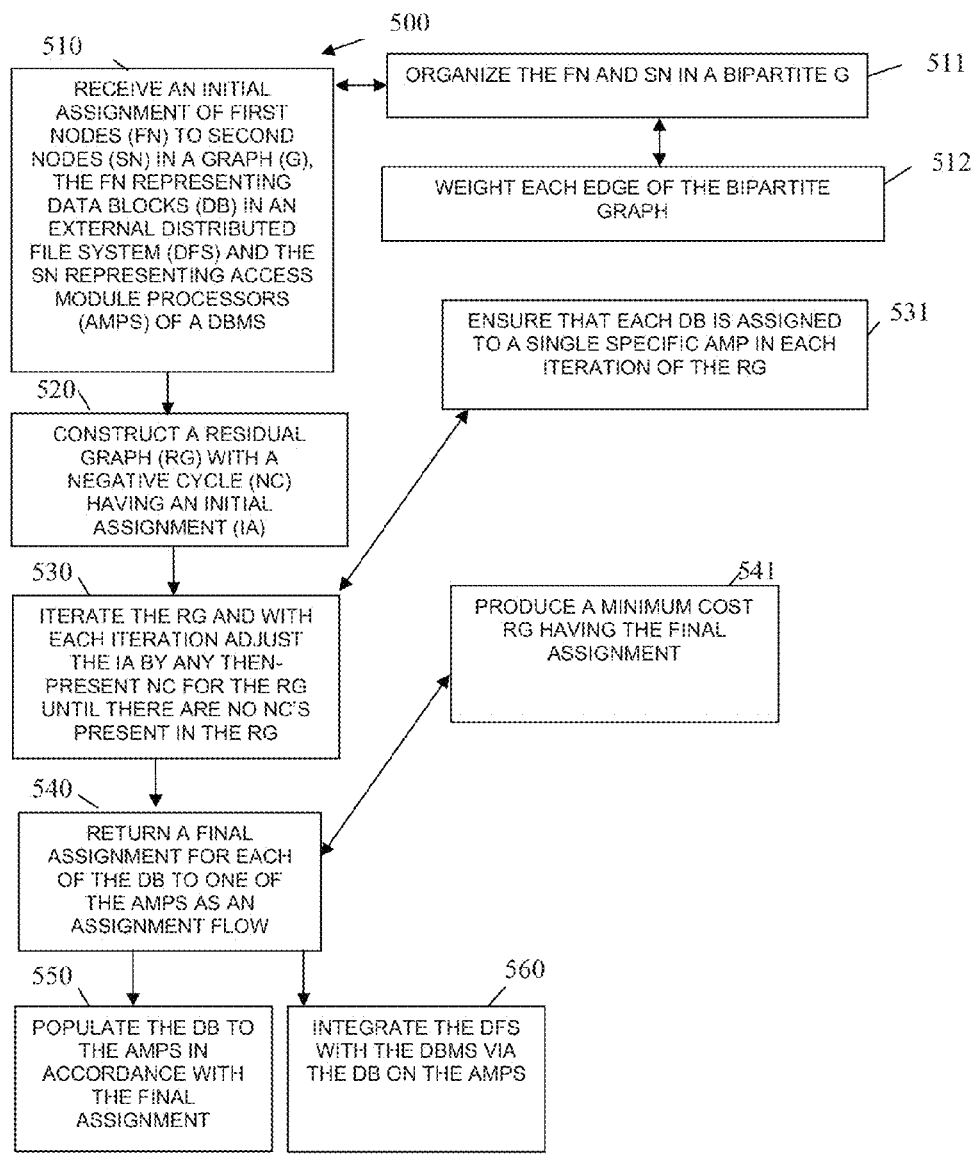
FIG. 5 is a diagram of a method for data assignment to an external DFS to a DMBS, according to an example embodiment.
Figure 6:
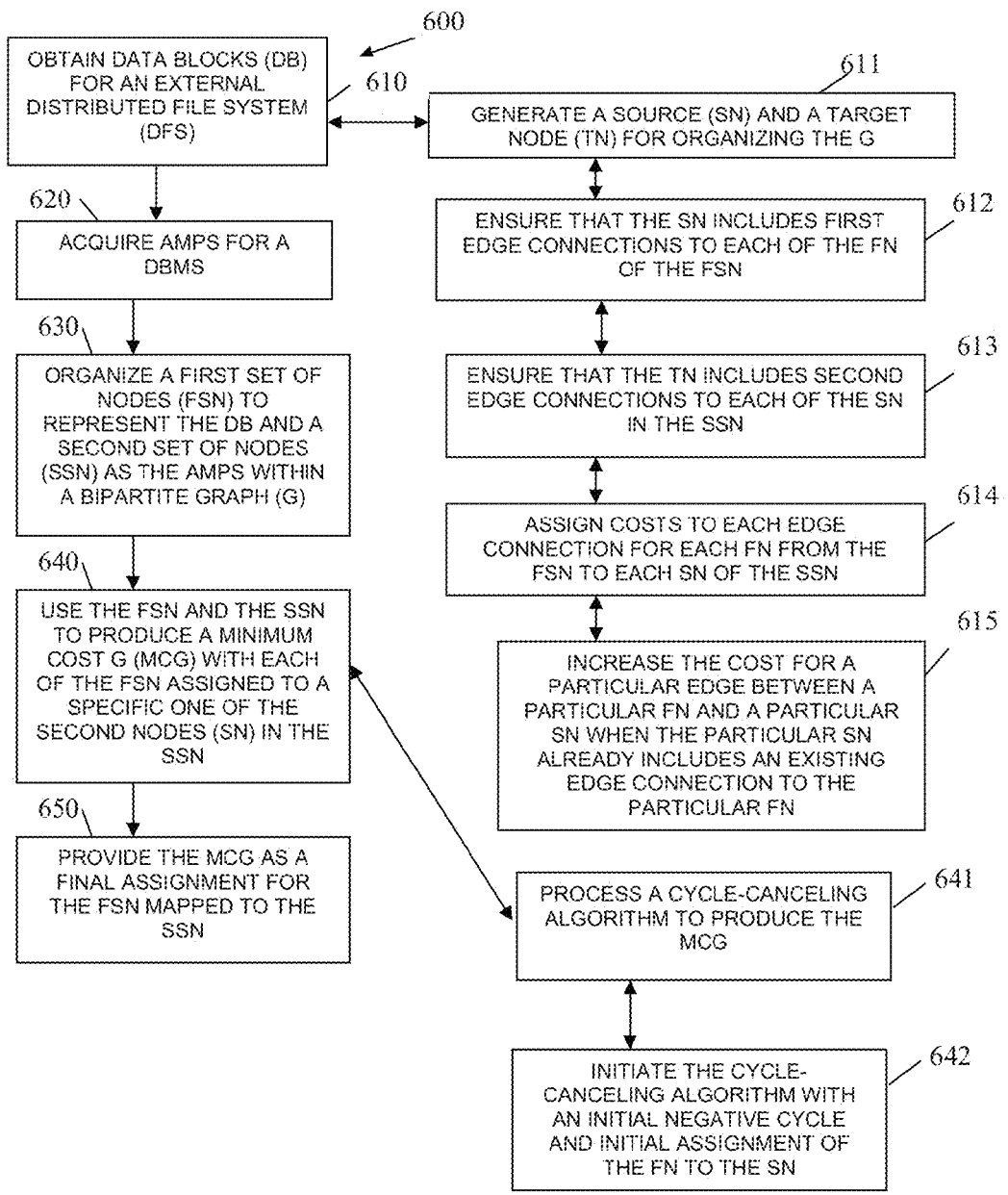
FIG. 6 is a diagram of another method for data assignment to an external DFS to a DMBS, according to an example embodiment.
Figure 7:
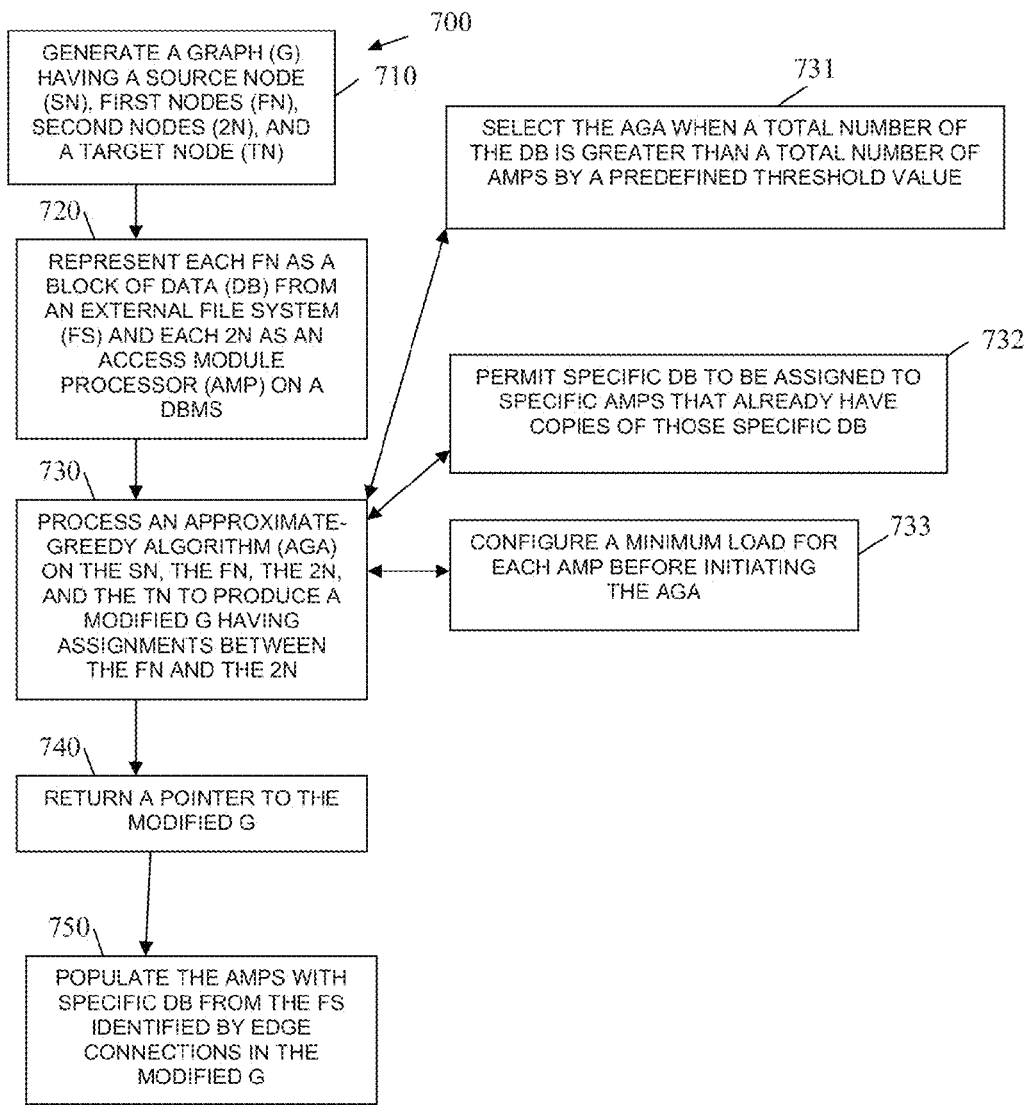
FIG. 7 is a diagram of yet? method for data assignment to an external DFS to a DMBS, according to an example embodiment.

With the above detail of the techniques presented, various embodiments are now presented with the discussion of the FIGS. 5-7.

FIG. 5 is a diagram of a method for data assignment to an external DFS to a DMBS, according to an example embodiment. The method 500 (hereinafter "data assignment manager") is implemented as instructions within a non-transitory computer-readable storage medium that execute on one or more processors, and the processors are specifically configured to execute the data assignment manager. Moreover, the data assignment manager is programmed within a non-transitory computer-readable storage medium. The data assignment manager is also operational over a network; the network is wired, wireless, or a combination of wired and wireless.

The data assignment manager presents another and in some ways an enhanced processing perspective to what was discussed and shown above with respect to the FIGS. 1-4.

At 510, the data assignment manager receives an initial assignment of first nodes to second nodes in a bipartite graph, such as the bipartite graph shown above with respect to the FIG. 2. The first nodes representing data blocks in an external distributed file system, such as a HDFS, and the second nodes representing AMPs of a parallel DBMS.

According to an embodiment, at 511, the data assignment manager organizes the first nodes and the second nodes in the bipartite graph.

Continuing with the embodiment of 511 and at 512, the data assignment manager weights each edge of the bipartite graph.

At 520, the data assignment manager constructs a residual graph with a negative cycle having an initial assignment. That is, the process associated with constructing the graph is given an initial assignment with a negative cycle.

At 530, the data assignment manager iterates the residual graph such that with each iteration the initial assignment is adjusted to eliminate negative cycles of the residual graph. Finally, there is no negative cycles present in the residual graph. This situation was discussed above with reference to the FIG. 3.

In an embodiment, at 531, the data assignment manager ensures that each data block is assigned to a single specific access module processor in each iteration of the residual graph.

At 540, the data assignment manager returns a final assignment for each of the data blocks to one of the AMPs as an assignment flow. In other words, the graph includes assignments for each data block to a specific AMP.

In an embodiment, at 550, the data assignment manager populates the data blocks to the AMPs in accordance with the final assignment.

In a scenario, at 560, the data assignment manager integrates the distributed file system with the DBMS via the data blocks on the assigned AMPs.

FIG. 6 is a diagram of another method 600 for data assignment to an external DFS to a DMBS, according to an example embodiment. The method 600 (hereinafter "workload assignment manager") is implemented as instructions within a non-transitory computer-readable storage medium that execute on one or more processors, and the processors are specifically configured to execute the workload assignment. Moreover, the workload assignment manager is programmed within a non-transitory computer-readable storage medium. The workload assignment manager is also operational over a network; the network is wired, wireless, or a combination of wired and wireless.

The workload assignment manager presents yet another view of the processing discussed above with respect to the FIGS. 1-5.

At 610, the workload assignment manager obtains data blocks for an external distributed file system.

According to an embodiment, at 611, the workload assignment manager generates a source node and a target node for organizing the graph.

Continuing with the embodiment of 611 and at 612, the workload assignment manager ensures that the source node includes first edge connections to each of the first nodes of the first set of nodes.

Still continuing with the embodiment of 612 and at 613, the workload assignment manager ensures that the target node includes second edge connections to each of the second nodes in the second set of nodes.

Continuing with the embodiment of 613 and at 614, the workload assignment manager assigns costs to each edge connection for each first node from the first set of nodes to each second node from the second set of nodes.

Still continuing with the embodiment of 614 and at 615, the workload assignment manager increases the cost for a particular edge between a particular first node and a particular second node when the particular second node already includes an existing edge connection to the particular first node. This was discussed in detail above with reference to the FIGS. 1-3.

At 620, the workload assignment manager acquires AMPs for a DBMS.

At 630, the workload assignment manager organizes a first set of nodes to represent the data blocks and a second set of nodes as the AMPs within a bipartite graph.

At 640, the workload assignment manager uses the first set of nodes and the second set of nodes to produce a minimum cost graph with each of the first set of nodes assigned to a specific one of the second nodes in the second set of nodes.

According to an embodiment at 641, the workload assignment manager processes a cycle-canceling algorithm to produce the minimum cost graph.

Continuing with the embodiment of 641 and at 642, the workload assignment manager initiates the cycle-canceling algorithm with an initial negative cycle and initial assignment of the first nodes to the second nodes.

At 650, the workload assignment manager provides the minimum cost graph as a final assignment for the first set of nodes mapped to the second set of nodes.

FIG. 7 is a diagram of yet method 700 for data assignment to an external DFS to a DMBS, according to an example embodiment. The method 700 (hereinafter "block assignment manager") is implemented as instructions within a non-transitory computer-readable storage medium that execute on one or more processors, the processors specifically configured to execute the block assignment manager. Moreover, the block assignment manager is programmed within a non-transitory computer-readable storage medium. The block assignment manager is also operational over a network; the network is wired, wireless, or a combination of wired and wireless.

The block assignment manager presents another perspective and some aspects enhancements to the processing show above with respect to the FIGS. 1-6.

At 710, the block assignment manager generates a graph having a source node, first nodes, second nodes, and a target node.

At 720, the block assignment manager represents each first node as a block of data from an external file system, such as HDFS, and each second node as an AMP on a parallel DBMS.

At 730, the block assignment manager processes an approximate-greedy algorithm on the source node, the first nodes, the second nodes, and the target node to produce a modified graph having assignments between the first nodes and the second nodes. This was described above with reference to the FIG. 4.

According to an embodiment, at 731, the block assignment manager selects the approximate-greedy algorithm when the total number of the data blocks is greater than the total number of AMPs by a predetermined threshold value.

In a scenario, at 732, the block assignment manager permits specific data blocks to be assigned to specific AMPs that already have copies of those specific data blocks.

In another case, at 733, the block assignment manager configures a minimum load for each AMP before initiating the approximate-greedy algorithm.

At 740, the block assignment manager returns a pointer to the modified graph.

According to an embodiment, at 750, the block assignment manager populates the AMPs with specific databases for the external file system, which are identified by edge connections in the modified graph.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
   iterating, by a processor, blocks of data associated with an external file system to assign each block to particular access module processors (AMPs) of a Distributed Database Management System (DBMS); and
   performing load balancing on each of the AMPs while iteratively assigning each of the blocks to the AMPs by initializing the load balancing with a feasible solution based on costs of assigning each of the blocks and solving for an optimal solution in view of the feasible solution and the costs.

2. The method of claim 1, wherein iterating further includes using a graph having an initial assignment of the blocks to the AMPs.

3. The method of claim 2, wherein performing further includes ending the load balancing when there are no remaining negative cycles present in the graph.

4. The method of claim 3 further comprising, returning the graph with final assignments for the blocks mapped to the AMPs.

5. The method of claim 4 further comprising, populating the data for each of the blocks to that block's assigned AMP.

6. The method of claim 5 further comprising, instructing each AMP to process in parallel to integrate the data from the external file system into the DBMS.

7. The method of claim 1 further comprising, returning final assignments of the blocks to the AMPs in a minimum cost graph.

8. The method of claim 7, wherein returning further includes representing the minimum cost graph with a source node being the external file system, first nodes being the blocks, second nodes being the AMPs, and a target node being the DBMS.

9. The method of claim 8 further comprising processing the minimum cost graph to have the AMPs migrate the data associated with the blocks from the external file system to the DBMS.

10. A method, comprising:
    modifying, by a processor, a graph that represents assignments of blocks of data from an external file system to access module processors (AMPS) of a Distributed Database Management System (DBMS) to produce a modified graph by initializing an initial feasible solution based on costs of assigning each of the blocks and solving for an optimal solution in view of the feasible solution and the costs;
    processing the modified graph to populate the data for the blocks to assigned AMPs; and
    instructing the AMPs to migrate the data to the DBMS.

11. The method of claim 10, wherein modifying further includes iterating the graph and reducing identified negative cycles during each iteration until the modified graph has eliminated the negative cycles.

12. The method of claim 10, wherein modifying further includes iterating the graph to ensure each block assignment is made to balance an assignment load associated with each of the AMPs.

13. The method of claim 10, wherein modifying further includes receiving the graph as a bipartite graph.

14. The method of claim 13, wherein modifying further includes producing the modified graph as a minimum cost bipartite graph.

15. The method of claim 10, wherein modifying further includes identifying the blocks as a first set of nodes within the graph and the AMPs as a second set of nodes within the graph.

16. The method of claim 10, wherein processing further includes providing each of the AMPs a source node representing the external file system for each AMP to obtain and to populate that AMP's portion of the data.

17. The method of claim 10, wherein instructing further includes directing the AMPs to process in parallel with one another when migrating the data to the DBMS.

18. A Distributed Database Management System (DBMS), comprising:
    processing nodes distributed over a network;
    a block assignment manager adapted to and operative to: i) execute on at least one of the processing nodes, ii) produce a load balanced graph representing first nodes for blocks of data associated with an external distributed file system and second nodes for access module processors (AMPs) that the execute on the processing nodes by initializing the load balanced graph with a feasible solution based on costs of assigning each of the blocks and solving for an optimal solution in view of the feasible solution and the costs, and iii) populate the data to the blocks to appropriate AMPs to migrate into the DBMS.

19. The DBMS of claim 18, wherein the block assignment manager is further adapted to and operable to, in ii), remove negative cycles from the load balanced graph.

20. The DBMS of claim 18, wherein the block assignment manager is further adapted to and operable to, in ii), perform multiple iterations on the load balanced graph adjusting assignments for the blocks to the AMPs.

* * * * *